United States Patent
Cuddihy et al.

(10) Patent No.: US 11,624,620 B2
(45) Date of Patent: Apr. 11, 2023

(54) IN-VEHICLE TRACKING APPARATUS AND METHOD

(71) Applicant: Ford Global Technologies, LLC, Dearborn, MI (US)

(72) Inventors: Mark A. Cuddihy, New Boston, MI (US); Gary Steven Strumolo, Canton, MI (US); Pramita Mitra, West Bloomfield, MI (US); David Melcher, Ypsilanti, MI (US); Ali Hassani, Ann Arbor, MI (US); Craig Simonds, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 747 days.

(21) Appl. No.: 15/580,446

(22) PCT Filed: Aug. 18, 2015

(86) PCT No.: PCT/US2015/045728
§ 371 (c)(1),
(2) Date: Dec. 7, 2017

(87) PCT Pub. No.: WO2017/030567
PCT Pub. Date: Feb. 23, 2017

(65) Prior Publication Data
US 2018/0180424 A1    Jun. 28, 2018

(51) Int. Cl.
*G01C 21/34* (2006.01)
*G08B 21/02* (2006.01)
(Continued)

(52) U.S. Cl.
CPC ........ *G01C 21/3415* (2013.01); *A01K 29/005* (2013.01); *G01C 21/362* (2013.01);
(Continued)

(58) Field of Classification Search
CPC .............. G01C 21/3415; G01C 21/362; G01C 21/3667; A01K 29/005; G01S 19/42; G08B 21/0269; G08B 21/0283
See application file for complete search history.

(56) References Cited

U.S. PATENT DOCUMENTS 6,977,612 B1 * 12/2005 Bennett ................. B60R 25/102
342/357.46
7,034,747 B1    4/2006 Walters et al.
(Continued)

FOREIGN PATENT DOCUMENTS

CN    1409088 A    4/2003
CN    103090879 A *    5/2013 ......... G01C 21/3438
(Continued)

OTHER PUBLICATIONS

English translation of CN-103090879-A to Braeuchle C cited above. 10 pages (Year: 2013).*

*Primary Examiner* — Daniel L Greene
(74) *Attorney, Agent, or Firm* — David R. Stevens; Stevens Law Group

(57) ABSTRACT

A method of in-vehicle tracking begins with establishing a communication link between a mobile device and a navigation system of a vehicle. The navigation system presents driving instructions leading to a destination. Each of a plurality of locations is serially passed over the communication link from the mobile device to the navigation system. Additionally, each of the plurality of locations is serially set, as it is communicated, as the destination within the navigation system. As the destination within the navigation system is updated, the driving instructions leading to that destination are updated as well.

19 Claims, 6 Drawing Sheets

(51) Int. Cl.
*H04W 4/40* (2018.01)
*G01S 19/42* (2010.01)
*G01C 21/36* (2006.01)
*A01K 29/00* (2006.01)

(52) U.S. Cl.
CPC ..... *G08B 21/0269* (2013.01); *G08B 21/0283* (2013.01); *G01C 21/3667* (2013.01); *G01S 19/42* (2013.01); *H04W 4/40* (2018.02)

(56) References Cited

U.S. PATENT DOCUMENTS

| | | | |
|---|---|---|---|
| 7,239,961 B2 | 7/2007 | Banet et al. | |
| 8,150,617 B2 | 4/2012 | Manber et al. | |
| 8,223,012 B1* | 7/2012 | Diem | G06Q 10/00 340/539.13 |
| 9,280,559 B1* | 3/2016 | Jones | G06F 16/29 |
| 2006/0270421 A1* | 11/2006 | Phillips | G08B 21/0272 455/457 |
| 2007/0207793 A1* | 9/2007 | Myer | H04M 3/42221 455/419 |
| 2007/0208497 A1* | 9/2007 | Downs | G08G 1/0104 701/117 |
| 2007/0210936 A1* | 9/2007 | Nicholson | G08G 1/123 340/988 |
| 2008/0062120 A1 | 3/2008 | Wheeler | |
| 2008/0114541 A1* | 5/2008 | Shintani | G01C 21/362 701/457 |
| 2009/0044758 A1 | 2/2009 | Adams | |
| 2010/0019924 A1 | 1/2010 | D'Alessandro | |
| 2010/0312476 A1* | 12/2010 | Mueller | G01C 21/362 701/302 |
| 2011/0022305 A1 | 1/2011 | Okamoto | |
| 2012/0190386 A1* | 7/2012 | Anderson | G01C 15/04 455/456.3 |
| 2012/0206296 A1 | 8/2012 | Wan | |
| 2013/0217333 A1* | 8/2013 | Sprigg | G06Q 30/0207 455/41.2 |
| 2014/0136414 A1* | 5/2014 | Abhyanker | G06Q 50/28 705/44 |
| 2015/0112885 A1* | 4/2015 | Fadell | G08B 25/008 705/330 |
| 2016/0258758 A1* | 9/2016 | Houston | G01C 21/20 |
| 2016/0261425 A1* | 9/2016 | Horton | H04L 12/2816 |
| 2016/0286355 A1* | 9/2016 | Shur | H04W 4/029 |
| 2016/0358432 A1* | 12/2016 | Branscomb | G08B 13/1965 |

FOREIGN PATENT DOCUMENTS

| | | |
|---|---|---|
| EP | 1515153 A1 | 3/2005 |
| JP | 2010010815 A | 1/2010 |
| WO | WO-0184274 A2 | 11/2001 |

\* cited by examiner

IN-VEHICLE TRACKING APPARATUS AND METHOD

RELATED APPLICATIONS

This application claims the benefit of PCT Application Serial No. PCT/US2015/045728, filed Aug. 18, 2015, which is hereby incorporated herein by reference in its entirety for all purposes.

BACKGROUND

Field of the Invention

This invention relates to computer-based tracking and search systems and more particularly to systems and methods for in-vehicle tracking of moving objects such as lost or runaway pets.

Background of the Invention

It is often necessary for humans to track or locate moving or movable objects. For example, caretakers may need to periodically track or locate lost or runaway pets. As the distances involved in such tracking or locating grow, the caretakers may quickly resort to the use of vehicles (e.g., automobiles) to aid in their efforts. However, combining tracking or search with driving a vehicle may lower the safety with which the driving may be performed. Accordingly, what is needed is an apparatus and method that enable vehicles to be safely used in tracking and locating efforts.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
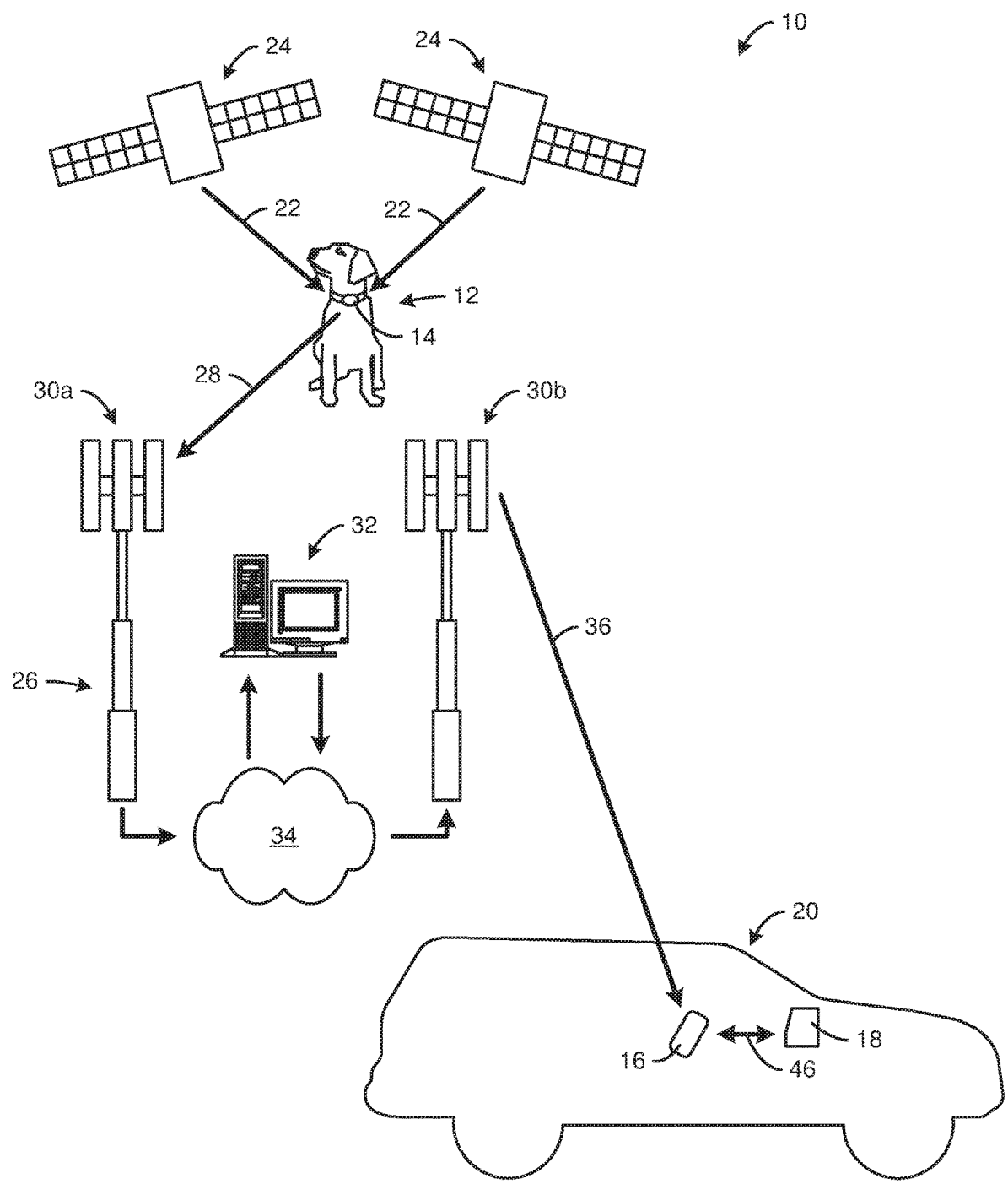
FIG. 1 is a schematic diagram illustrating a tracking system in accordance with the present invention.

Referring to FIG. 1, a system 10 in accordance with the present invention may provide, enable, or support in-vehicle tracking of a moving or movable object 12 (e.g., a lost or runway pet, lost or stolen piece of personal property, or the like). A system 10 may do this in any suitable method. For example, a system 10 may be embodied as hardware, software, or some combination thereof.

In certain embodiments, a system 10 may include a traveler 14, a mobile device 16, and an in-vehicle navigation system 18 (i.e., a navigation system 18 forming part of or located within a vehicle 20). A traveler 14 or traveling device 14 may be secured to a moving object 12 and receive, collect, and/or transmit information indicative of the location of a corresponding moving object 12. For example, in selected embodiments, a traveler 14 may collect or receive signals 22 (e.g., Global Positioning System (GPS) signals) originating from one or more sources 24 (e.g., GPS satellites). Calculations made using such signals 22 may indicate the current location of a traveler 14 and, therefore, the current location of the corresponding moving object 12 to which the traveler 14 is secured.

In selected embodiments, a traveler 14 may include at least one onboard processor. This may enable certain computations or calculations to be performed by the traveler 14. Accordingly, in certain embodiments, a traveler 14 may use the signals 22 received thereby to calculate its current location. Alternatively, a traveler 14 may simply pass information contained within such signals 22 on to one or more other components of a system 10 so that they may perform the necessary computations or calculations.

A traveler 14 may be secured to a moving object 12 in any suitable manner. In selected embodiments, the nature of the securement may depend on the nature of the moving object 12. For example, when a moving object 12 is an animal such a cat, dog, horse, or the like, a traveler 14 may be secured to the animal using a collar, halter, or harness. Alternatively, when a moving object 12 is inanimate (e.g., a bicycle or other piece of personal property), a traveler 14 may be secured to the moving object 12 using one or more adhesives, screws, bolts, hook-and-loop engagements or tapes, zip ties, or the like.

Location information (e.g., longitude and latitude or information or data that may be used to calculate longitude and latitude) corresponding to a traveler 14 may be fed by the traveler 14 into a communication system 26. For example, a traveler 14 may feed location information into a cellular telephone network by sending one or more signals 28 to a nearby cellular tower 30a. In selected embodiments, location information fed in by a traveler 14 may be directly routed through a communication system 26 to a mobile device 16. Alternatively, location information fed into a communication system 26 by a traveler 14 may be received by a computer system 32, processed by the computer system 32, fed by the computer system 32 back into the communications system 26, and routed to a mobile device 16.

For example, in selected embodiments, a communication system 26 may include a cellular telephone network comprising a first cellular tower 30a located near a moving object 12, a second cellular tower 30b located near a mobile device 16, and a network 34 connecting the first cellular tower 30a to the second cellular tower 30b. A computer system 32 may also connect to the network 34. Accordingly, location information fed into the cellular telephone network by a traveler 14 may be received by the computer system 32 so that it can be processed.

This processing may include computing or calculating a location corresponding to the location information, matching the location information to a corresponding mobile device 16, or a combination thereof. For example, if a traveler 14 sends out location information coupled with identification information, a computer system 32 may use the identification information to look up which mobile device 16 is a proper recipient of the location information.

Accordingly, a computer system 32 may set up and/or manage one or more user accounts for delivering tracking services in accordance with the present invention. In selected embodiments, such accounts may link particular travelers 14 to particular mobile devices 16, provide a mechanism for updating information or replacing one or both of a traveler 14 and mobile device 16, provide a mechanism for a user to pay for tracking services, or the like or a combination or sub-combination thereof.

Once a computer system 32 completes all necessary computations and calculations and/or identifies which mobile device 16 corresponds to the traveler 14 (e.g., which mobile device 16 is possessed by the caretaker of a pet wearing the traveler 14), location information may be fed by the computer system 32 back into the communications system 26. The communications system 26 may then route the location information to the proper mobile device 16. For example, the location information may be communicated via one or more signals 36 passing from a cellular tower 30b to a mobile device 16.

Figure 2:
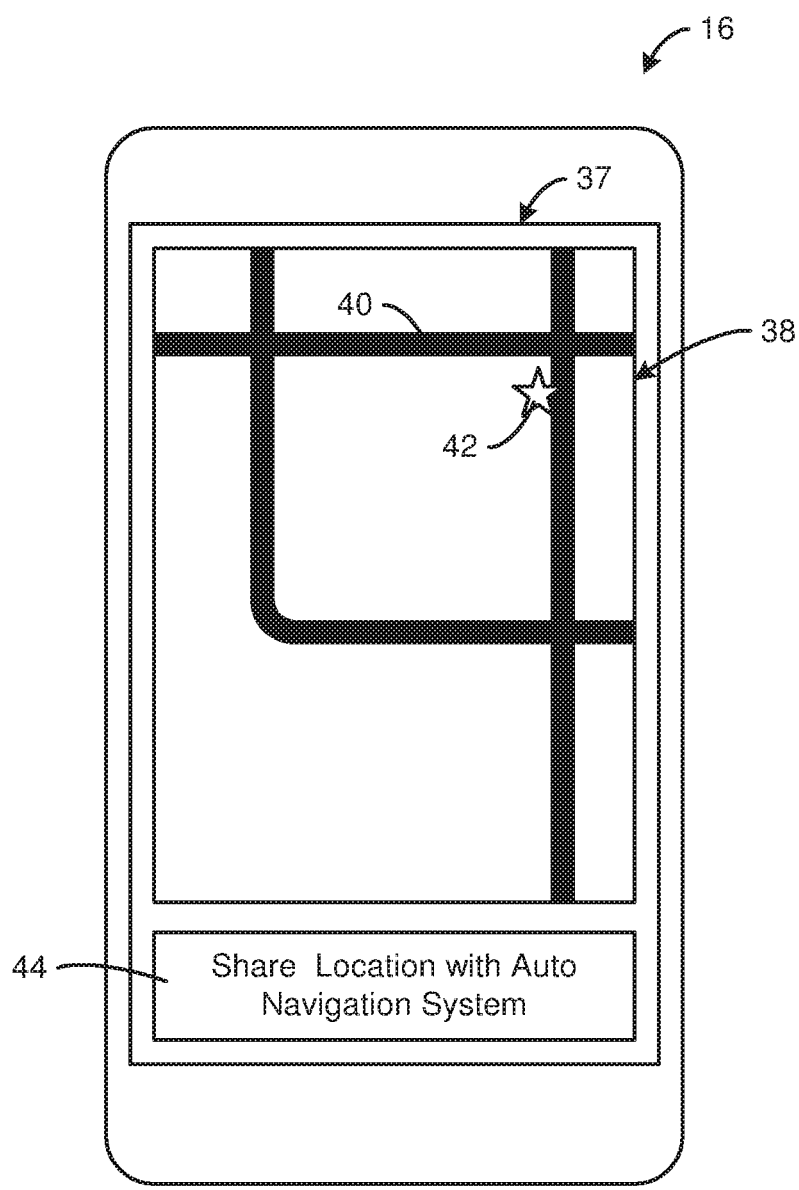
FIG. 2 is a schematic diagram of one embodiment of a screen-shot of a mobile device in accordance with the present invention.

Referring to FIGS. 1 and 2, a mobile device 16 may be a mobile telephone (e.g., a "smart" phone), tablet computer, laptop computer, personal digital assistant, or the like. In selected embodiments, a mobile device 16 may include a screen 37 displaying a map 38 comprising one or more roads 40 or other geographical features. A map 38 may also include (e.g., display) an icon 42 identifying a location of a traveler 14 and corresponding traveling object 12 with respect to the one or more roads 40 or other geographical features. By examining a map 38, zooming in or out as necessary to provide proper context, or the like, a user of a mobile device 16 may learn where a moving object 12 is currently located.

A communication system 26 may periodically route updated location information to a mobile device 16. That is, as the current location of the moving object 12 changes with time, a system 10 may use updated location information to determine an updated location of the moving object 12. This updated location may be communicated to a user by a new location of the icon 42 on the map 38. The frequency of such updates may be about five minutes or less and, in selected embodiments, in the range of about 10 seconds to about one minute. Accordingly, a user may use a mobile device 16 to track (e.g., locate, navigate toward) a moving object 12.

In certain embodiments, a mobile device 16 may comprise, include, or present one or more buttons 44. Activation of one or more such buttons 44 may enable a user to interact with, customize, or control various aspects of a system 10 in accordance with the present invention. For example, in selected embodiments, a mobile device 16 may include or present a "share" button 44. By selecting a share button, a user may instruct a mobile device 16 to share location information with a navigation system 18 of a vehicle 20.

That is, as the distances involved in tracking or locating a moving object 12 grow, a user may resort to the use of a vehicle 20 (e.g., automobile) to aid in his or her efforts. However, viewing and/or interacting with a mobile device 16 while driving a vehicle 20 may lower the safety with which the driving may be performed. Accordingly, in selected embodiments, a user may elect to share location information with a navigation system 18 so that the navigation system 18 may direct or conduct him or her to a current location of the moving object 12.

In certain embodiments, sharing location information may require that a communication link 46 be established between a mobile device 16 and a navigation system 18 of a vehicle 20. In selected embodiments, this communication link 46 may be a wireless pairing (e.g., a wireless pairing employing Ultra High Frequency (UHF) radio waves). Location information may be passed over the communication link 46 from a mobile device 16 to a navigation system 18. The location information may be used to update or set the destination within the navigation system 18 and the navigation system 18 may appropriately update a queue of driving instructions to be delivered (e.g., visual and audio driving instructions to be delivered by the navigation system 18 to the user).

For example, in selected embodiments, a mobile device 16 may pass longitude and latitude data over the communication link 46 to a navigation system 18. The navigation system 18 may use such data to identify and/or set a new destination. The navigation system 18 may be programmed to obtain and deliver visual and/or audio driving instructions that will direct a user to a destination. Accordingly, when location information corresponding to a current location of a moving object 12 is passed from a mobile device 16 to a navigation system 18, the navigation system 18 may set the destination to be that current location and obtain and deliver visual and/or audio driving instructions that will direct a user thereto.

In certain embodiments, a mobile device 16 may serially pass location information to a navigation system 18. For example, at a first time, a mobile device 16 may pass first location information to a navigation system 18. After a delay of some period of time, the mobile device 16 may pass second location information to the navigation system 18. The second location information may reflect changes in the location of the moving object 12 that occurred during the delay between the passing of the first and second location information.

After another delay, the mobile device 16 may pass third location information to the navigation system 18. The third location information may reflect changes in the location of the moving object 12 that occurred during the delay between the passing of the second and third location information. This process may continue until a user arrives at the location of the moving object 12, terminates the tracking process, disconnects or discontinues the communication link (e.g., terminates a wireless pairing session), or the like.

The periodicity at which location information is passed from a mobile device 16 to a navigation system 18 may vary between embodiments. For example, in selected embodiments, the delay may be about 5 minutes or less. In certain embodiments, the delay may be set or selected by a user. Accordingly, if a user would like more frequent location updates, the user may selected a shorter delay.

A navigation system 18 may serially update a destination and corresponding driving instructions directing a user to that destination. For example, at a first time, a navigation system 18 may receive first location information from a mobile device 16. Accordingly, the navigation system 18 may promptly set the destination to a first location corresponding to the first location information and generate a queue of corresponding first driving instructions.

After a delay of some period of time, the navigation system 18 may receive second location information from the mobile device 16. Accordingly, the navigation system 18 may promptly set the destination to a second location corresponding to the second location information and generate a queue of corresponding second driving instructions. The second driving instructions may differ from the first driving instructions to accommodate any change in the location of the moving object 12 that occurred during the delay between the receiving of the first and second location information.

After another delay, the navigation system 18 may receive third location information from the mobile device 16. Accordingly, the navigation system 18 may promptly set the destination to a third location corresponding to the third location information and generate a queue of corresponding third driving instructions. The third driving instructions may differ from the second driving instructions to accommodate any change in the location of the moving object 12 that occurred during the delay between the receiving of the second and third location information. This process may continue until a user arrives at the location of the moving object 12, terminates the tracking process, disconnects or discontinues the communication link (e.g., terminates a wireless pairing session), or the like.

Figure 3:
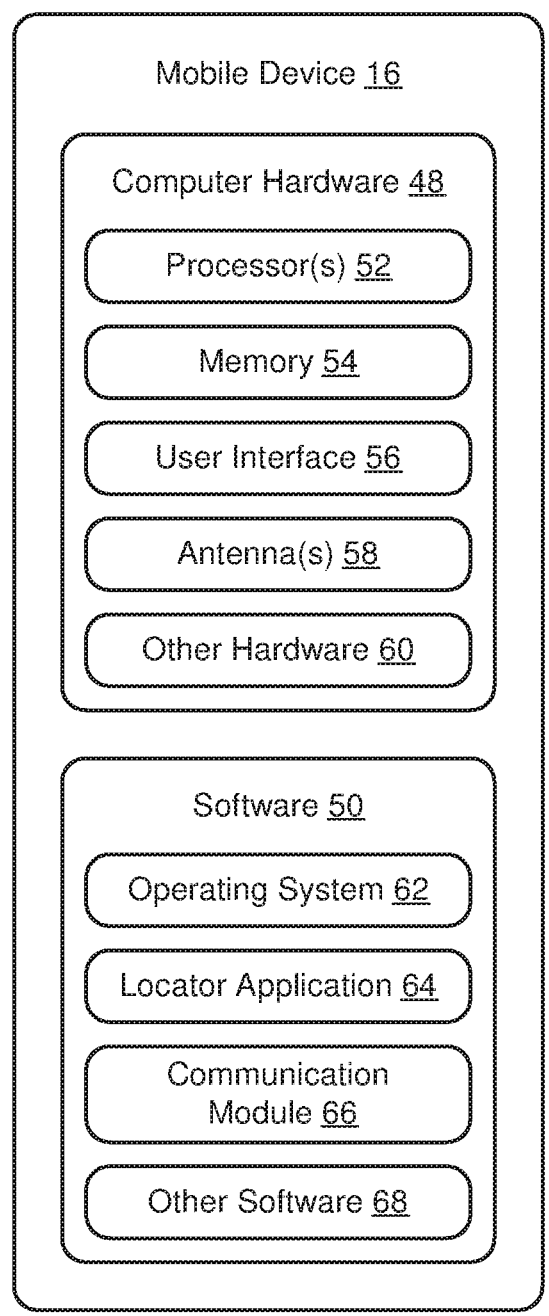
FIG. 3 is a schematic block diagram of one embodiment of a mobile device that may form part of a tracking system in accordance with the present invention.

Referring to FIG. 3, embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible, non-transient, medium of expression having computer-usable program code embodied in the medium.

For example, in selected embodiments, a mobile device 16 may comprise computer hardware 48 and computer software 50. Computer hardware 48 of a mobile device 16 may include one or more processors 52, memory 54, a user interface 56, one or more antennas 58, other hardware 60, or the like or a combination or sub-combination thereof. The memory 54 may store the computer software 50 and be operably connected to the one or more processors 52. This may enable the one or more processors 52 to execute the computer software 50.

A user interface 56 may enable a user to interact with, customize, or control various aspects of a mobile device 16. In selected embodiments, a user interface 56 of a mobile device 16 may include one or more buttons, keys, touch screens, pointing devices, or the like or a combination or sub-combination thereof.

In certain embodiments, one or more antennas 58 of a mobile device 16 may enable the mobile device 16 to receive and/or send signals to other components or sub-systems within a system 10. For example, in selected embodiments, a mobile device 16 may include an antenna 58 that enables the mobile device 16 to communicate with a communication system 26 (e.g., send signals to and receive signals from a nearby cellular tower 30*b*).

Computer software 50 of a mobile device 16 may include whatever systems, applications, or modules may be necessary for the mobile device 16 to function as desired. In selected embodiments, the computer software 50 of a mobile device 16 may include an operating system 62, locator application 64, communication module 66, other software 68, or the like or a combination or sub-combination thereof.

An operating system 62 may manage computer hardware and software resources of the mobile device 16 and provide common services for other computer programs (e.g., for a locator application 64, communication module 66, or the like). A locator application 64 may enable a mobile device 16 to receive location information identifying a current location of a moving object 12 and communicate (e.g., display) that current location to a user.

A communication module 66 may enable a mobile device 16 to pass (e.g., periodically or serially pass) location information to a navigation system 18. In certain embodiments, a communication module 66 may provide functionality enabling a user to initiate the passing of location information from a mobile device 16 to a navigation system 18, set the frequency or periodicity of such passing, terminate the passing of the location information, or the like or a combination or sub-combination thereof.

In selected embodiments, a communication module 66 may be programmed as an integral part of a locator application 64. In other embodiments, a communication module 66 may be programmed to be an add-on, plug-in, or extension of a locator application 64. In still other embodiments, a communication module 66 may be a standalone software application that is less intimately associated with a locator application 64.

Figure 4:
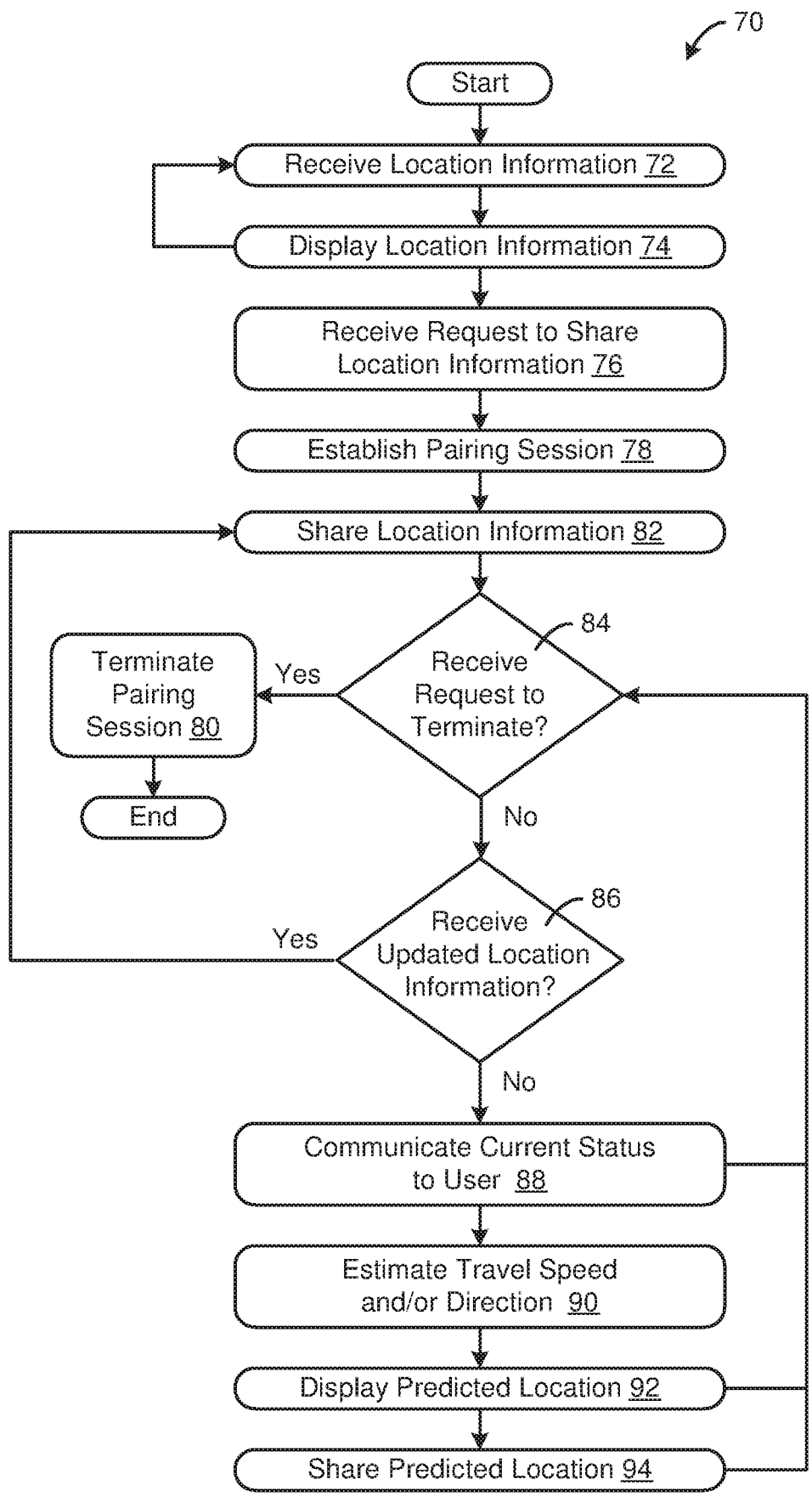
FIG. 4 is a schematic block diagram of one embodiment of a method corresponding to or executed by a mobile device in accordance with the present invention.

Referring to FIG. 4, a method 70 performed by a mobile device 16 in accordance with the present invention may include the steps of iteratively receiving 72 location information and displaying 74 that location information (or derivatives thereof or based thereon) to a user. During such iteration, the mobile device 16 may receive 76 an instruction from a user to share the location information with a navigation system 18. Accordingly, if a pairing or pairing session between the mobile device 16 and the navigation system 18 is not already established, such a pairing may be established 78.

In selected embodiments, an initial pairing between a mobile device 16 and a navigation system 18 may require certain actions or inputs by a user. Thereafter, however, the establishment of a pairing may be automatic (e.g., occur as soon as a mobile device 16 is within range of a corresponding navigation system 18, occur as soon as the pairing mechanism is turned "on," or the like or a combination thereof). A pairing session may be a period of time wherein a mobile device 16 and a corresponding navigation system 18 are in substantially constant communication with one another or a least have an avenue of communication immediately and substantially continuously available therebetween. Accordingly, a pairing session in accordance with the present invention may be established 78 to enable communication and be terminated 80 once the method 70 or process 70 has been completed and no further communication is needed.

Once a pairing session has been established 78, a mobile device 16 (e.g., a communication module 66 of a mobile device 16) may use the pairing to share 82 location information with a corresponding navigation system 18. At anytime thereafter, should a request or instruction to terminate a pairing session be received 84 or implied, the pairing session may be terminated 80 and the process 70 may end.

Conversely, if no request to terminate is received 84 or implied, a mobile device 16 may periodically receive 86 updated location information, which information (or derivatives thereof or based thereon) may be periodically or serially shared 82 with the corresponding navigation system 18.

If no updated location information is received 86 by a mobile device 16, it may indicate that a moving object 12 is located where a corresponding traveler 14 cannot receive the signals 22 necessary to determine location, cannot communication location information to a communication system 26, or the like. In any event, a failure to receive 86 updated location information indicates that the location of the moving object 12 can no longer be specifically determined. During such times, a mobile device 12 may simply communicate 88 the current status of the tracking effort to the user. For example, the mobile device 16 may inform the user that the moving object is currently "out of range" of the system 10.

When no updated location information is being received 86, communicating 88 the current status of the tracking effort to the user may be all that the mobile device 16 may do. Alternatively, a mobile device 16 may also use past movement of a moving object 12 to estimate 90 the speed and/or direction of the moving object 12. For example, if a moving object 12 has been traveling north on a particular road at about five miles per hour for the past five minutes, the mobile device 12 may estimate 90 or predict that the out-of-range moving object 12 has continued to travel north on that road at a speed of five miles per hour. Accordingly, a mobile device 12 may communicate or display 92 that predicated location to the user. This may be done in a manner that indicates the uncertainty of the prediction. For example, it may be done by shading an area where the moving object 12 is predicted to be based on recent speed and/or direction data. In selected embodiments, predicted location data may be shared 94 with a corresponding navigation system 18.

Figure 5:
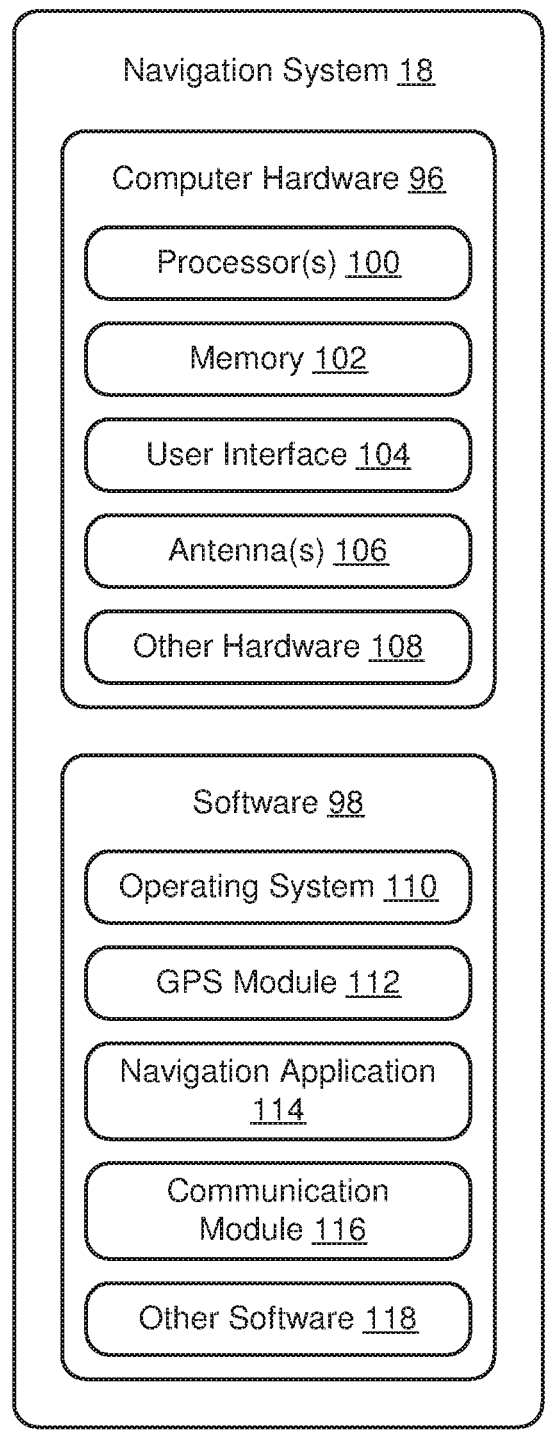
FIG. 5 is a schematic block diagram of one embodiment of a navigation system of a vehicle, which system may form part of a tracking system in accordance with the present invention.

Referring to FIG. 5, in certain embodiments, a navigation system 18 may comprise computer hardware 96 and computer software 98. The computer hardware 96 of a navigation system 18 may include one or more processors 100, memory 102, a user interface 104, one or more antennas 106, other hardware 108, or the like or a combination or sub-combination thereof. The memory 102 may be operably connected to the one or more processors 100 and store the computer software 98. This may enable the one or more processors 100 to execute the computer software 98.

The user interface 104 may enable a user to interact with, customize, or control various aspects of a navigation system 18. In selected embodiments, the user interface 104 of a navigation system 18 may include one or more buttons, keys, touch screens, pointing devices, or the like or a combination or sub-combination thereof.

In certain embodiments, the one or more antennas 106 of a navigation system 18 may enable the navigation system 18 to receive signals that support the determination of location. For example, in selected embodiments, a navigation system 18 may include an antenna 106 that enables the navigation system 18 to receive GPS signals from one or more GPS satellites.

Computer software 98 of a navigation system 18 may include whatever systems, applications, or modules may be necessary for the navigation system 18 to function as desired. In selected embodiments, the computer software 98 of a navigation system 18 may include an operating system 110, GPS module 112, navigation application 114, communication module 116, other software 118, or the like or a combination or sub-combination thereof.

An operating system 110 may manage computer hardware and software resources of the navigation system 114 and provide common services for other computer programs (e.g., for a GPS module 112, navigation application 114, communication module 116, or the like). A GPS module 112 may enable a navigation system 18 to determine location (e.g., latitude and longitude) based on GPS signals received by the navigation system 18. The GPS module 112 may pass such location data to the navigation application 114.

A navigation application 114 may enable a navigation system 18 to obtain or generate a queue of driving instructions for navigating from a current location (which currently location may be provided by the GPS module) occupied by the corresponding vehicle 20 to a selected destination. A navigation application 114 may also provide for the sequential and time-appropriate delivery or communication of such driving instructions to the user.

A communication module 116 may enable a navigation system 18 to receive (e.g., periodically or serially receive) location information from a mobile device 16. A communication module 116 may also cooperate (e.g., periodically or serially cooperate) with a navigation application 114 to set the destination used by the navigation application 114 to a location corresponding to the location information received from the mobile device 16.

In selected embodiments, a communication module 116 may be programmed as an integral part of a navigation application 114. In other embodiments, a communication module 116 may be programmed to be an add-on, plug-in, or extension of a navigation application 114. In still other embodiments, a communication module 116 may be a standalone software application that is less intimately associated with a navigation application 114.

Figure 6:
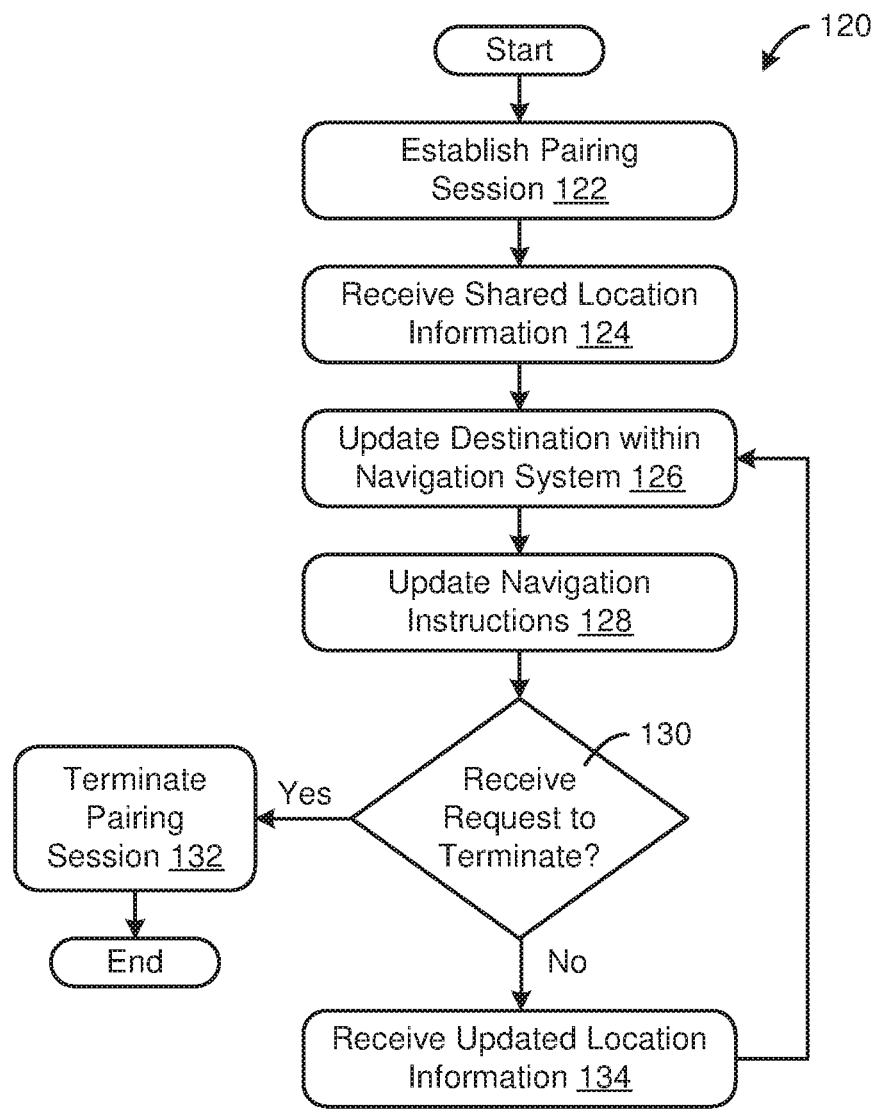
FIG. 6 is a schematic block diagram of one embodiment of a method corresponding to or executed by a navigation system in accordance with the present invention.

Referring to FIG. 6, a method 120 performed by a navigation system 18 in accordance with the present invention may begin when a pairing or pairing session between a mobile device 16 and the navigation system 18 is established 122. Once a pairing session has been established 122, a navigation system 18 (e.g., a communication module 116 of a navigation system 18) may use the pairing to receive 124 location information shared by a corresponding mobile device 16. The navigation system 18 may then promptly update 126 the destination of the navigation system 18 to be the location communicated by the location information. Additionally, the navigation system 18 may update 128 a queue of driving instructions. The updated driving instructions may be suitable for reaching the updated destination.

At anytime thereafter, should a request or instruction to terminate a pairing session be received 130 or implied, the pairing session may be terminated 132 and the process 120 may end. Conversely, if no request to terminate is received 130 or implied, a navigation system 18 may periodically receive 134 updated location information from a mobile device 16. When the updated location information is received 134, the destination set within the navigation system 18 may be updated 126 accordingly. The queue of driving instructions may also be updated 128 as necessary. If no updated location information is received 134, the navigation system 126 may continue to operate, directing the user to the last destination set within the navigation system.

The flowcharts in FIGS. 4 and 6 illustrate the architecture, functionality, and operation of possible implementations of systems, methods, and computer program products according to certain embodiments of the present invention. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
   establishing a communication link between a mobile device and a navigation system of a vehicle, the navigation system presenting driving instructions leading to a destination;
   receiving, in a series by the mobile device, a plurality of locations wherein each successive location within the plurality of locations is an updated location of a movable object;
   communicating, as it is received by the mobile device, each of the plurality of locations over the communication link from the mobile device to the navigation system; and
   serially setting, as it is communicated over the communication link, each of the plurality of locations as the destination within the navigation system and updating the driving instructions accordingly.

2. The method of claim 1, wherein communicating each of the plurality of locations over the communication link comprises passing one location of the plurality of locations after another location of the plurality of locations at substantially regular intervals of about five minutes or less.

3. The method of claim 2, wherein the moving object is a pet animal located outside of confines set by its caretaker.

4. The method of claim 3, further comprising:
   receiving, by the mobile device from the caretaker, a command to share location information corresponding to the pet animal with the navigation system; and
   initiating the communicating in response to the command.

5. The method of claim 4, wherein the communication link comprises a wireless pairing.

6. The method of claim 5, wherein each location of the plurality of locations is communicated from the mobile device to the navigation system within a single, unbroken session of the wireless pairing.

7. The method of claim 6, wherein the establishing, communicating, and setting occur while the mobile device is located within the vehicle.

8. The method of claim 7, wherein the receiving the command occurs while the mobile device is located within the vehicle.

9. The method of claim 8, wherein the wireless pairing employs Ultra High Frequency (UHF) radio waves.

10. A method comprising:
    establishing a communication link between a mobile device and a navigation system of a vehicle, the navigation system presenting driving instructions leading to a destination;
    receiving, in a series by the mobile device, multiple pieces of location information wherein each successive piece thereof identifies an updated location of a traveling object;
    passing a first piece of the multiple pieces of location information over the communication link from the mobile device to the navigation system, the first piece identifying a first location occupied by the traveling object at a first time;
    setting the first location as the destination within the navigation system and updating the driving instructions accordingly;
    passing, after the passing of the first piece, a second piece of the multiple pieces of location information over the communication link from the mobile device to the navigation system, the second piece identifying a second location occupied by the traveling object at a second time, subsequent to the first time; and
    setting, after the passing of the second piece, the second location as the destination within the navigation system and updating the driving instructions accordingly.

11. The method of claim 10, wherein the second time is about five minutes or less after the first time.

12. The method of claim 11, wherein the traveling object is a pet animal located outside of confines set by its caretaker.

13. The method of claim 12, wherein the communication link comprises a wireless pairing.

14. The method of claim 13, wherein the first and second pieces are both communicated from the mobile device to the navigation system within a single, unbroken session of the wireless pairing.

15. The method of claim 14, wherein the establishing, passing of the first piece, setting the first location, passing the second piece, and setting the second location occur while the mobile device is located within the vehicle.

16. A system comprising:
    a navigation system forming part of a vehicle;
    a mobile device connected to the navigation system by a communication link;
    the mobile device communicating, in a series over the communication link to the navigation system, a plurality of locations wherein each successive location within the plurality of locations is an updated location of a movable object; and
    the navigation system serially setting, as it is communicated by the mobile device, each of the plurality of locations as the destination within the navigation system and updating the driving instructions accordingly.

17. The system of claim 16, wherein the communication link comprises a wireless pairing.

18. The system of claim 17, wherein each location of the plurality of locations is communicated from the mobile device to the navigation system within a single, unbroken session of the wireless pairing.

19. The system of claim 18, wherein the communicating and setting occur while the mobile device is located within the vehicle.

* * * * *